United States Patent
Woo et al.

(10) Patent No.: US 7,760,696 B2
(45) Date of Patent: Jul. 20, 2010

(54) APPARATUS AND METHOD FOR CONTROLLING WIRELESS TERMINAL

(75) Inventors: Moo-Yeon Woo, Seongnam-si (KR); Gui-Jung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1057 days.

(21) Appl. No.: 10/967,193

(22) Filed: Oct. 19, 2004

(65) Prior Publication Data

US 2005/0094612 A1 May 5, 2005

(30) Foreign Application Priority Data

Nov. 3, 2003 (KR) ............... 10-2003-0077422

(51) Int. Cl.
*H04B 7/216* (2006.01)
(52) U.S. Cl. ............... 370/342; 455/26.1; 455/414; 370/335
(58) Field of Classification Search ......... 370/342, 370/335; 455/414, 421, 26.1; 379/56.3
See application file for complete search history.

(56) References Cited

U.S. PATENT DOCUMENTS

| | | | |
|---|---|---|---|
| 6,647,328 | B2 | 11/2003 | Walker |
| 6,700,534 | B2 | 3/2004 | Harris |
| 6,738,572 | B2 | 5/2004 | Hunter |
| 2001/0005681 | A1 | 6/2001 | Kim |
| 2001/0006546 | A1* | 7/2001 | Jung ............... 379/56.3 |
| 2002/0055361 | A1 | 5/2002 | McDonnell et al. |
| 2002/0107005 | A1* | 8/2002 | Kim ............... 455/414 |
| 2003/0070177 | A1* | 4/2003 | Kondo et al. ............... 725/106 |
| 2004/0147255 | A1 | 7/2004 | Lee |
| 2007/0129012 | A1* | 6/2007 | Snow ............... 455/26.1 |

FOREIGN PATENT DOCUMENTS

| | | |
|---|---|---|
| CN | 1192633 | 9/1998 |
| EP | 1 139 684 | 10/2001 |
| EP | 1139684 | 10/2001 |
| EP | 1 499 148 | 1/2005 |
| JP | 08223647 | 8/1996 |
| JP | 09168182 | 6/1997 |
| JP | 11122166 | 4/1999 |
| JP | 11-261674 | 9/1999 |
| JP | 20011094518 | 4/2001 |
| JP | 2002-50998 | 2/2002 |

(Continued)

OTHER PUBLICATIONS

Japanese Office Action for Japanese Patent Application No. 2004-319197, issued on Oct. 17, 2006.

(Continued)

*Primary Examiner*—David Q Nguyen
(74) *Attorney, Agent, or Firm*—H.C. Park & Associates, PLC

(57) ABSTRACT

An apparatus and method for controlling a wireless terminal, including parameter information to control a camera function of the wireless terminal is set, a camera control message to automatically control the camera function is set to be transmitted through a message transmission unit, the wireless terminal obtains the camera control message periodically transmitted from the message transmission unit, and a camera mode is automatically converted through parameter information of the obtained camera control message, so that it is possible to protect the camera function of the wireless terminal from malicious use.

10 Claims, 10 Drawing Sheets

FOREIGN PATENT DOCUMENTS

| | | |
|---|---|---|
| JP | 2002-95064 | 3/2002 |
| JP | 2002-135838 | 5/2002 |
| JP | 2003-259460 | 9/2003 |
| JP | 2003-289358 | 10/2003 |
| JP | 2005-33799 | 2/2005 |
| KR | 10-2000-0056688 | 9/2000 |
| KR | 10-2001-0059725 | 7/2001 |

OTHER PUBLICATIONS

European Search Report corresponding to European Patent Application No. 04025942.6, issued on Aug. 26, 2005.

Australian Office action for Australian Patent Application No. 2004222717, dated Nov. 24, 2005.

Office action from the Japanese Patent Office issued in Applicant's corresponding Japanese Patent Application No. 2004-319197 dated Nov. 13, 2007.

Chinese Office Action for Korean Patent Application No. 2003-77422, issued on Sep. 1, 2006.

Office action from the Patent Office of the Korean Intellectual Property Office issued in Applicant's corresponding Korean Patent Application No. 10-2003-0077422 dated Jul. 28, 2005.

* cited by examiner

FIG. 4

| Information Element/Group name | Need | Multi | Type and reference | Semantics description |
|---|---|---|---|---|
| SIB type | MP | | Enumerated, see below | |

```
typedef enum{
    Master Information block,
    System Information Type 1,
    System Information Type 2,
    System Information Type 3,
    System Information Type 4,
    System Information Type 5,
    System Information Type 6,
    System Information Type 7,
    System Information Type 8,
    System Information Type 9,
    System Information Type 10,
    System Information Type 11,
    System Information Type 12,
    System Information Type 13,
    System Information Type 13.1,
    System Information Type 13.2,
    System Information Type 13.3,
    System Information Type 13.4,
    System Information Type 14,
    System Information Type 15,
    System Information Type 15.1,
    System Information Type 15.2,
    System Information Type 15.3,
    System Information Type 15.4,
    System Information Type 15.5,
    System Information Type 16,
    System Information Type 17,
    System Information Type 18,
   Scheduling Block 1,
   Scheduling Block 2,
    System Information Type 19, --> TYPE FOR CONTROLLING CAMERA
                                   CONTROL FUNCTION
}
```

APPARATUS AND METHOD FOR CONTROLLING WIRELESS TERMINAL

CLAIM OF PRIORITY

This application makes reference to, incorporates the same herein, and claims all benefits accruing under 35 U.S.C. §119 from an application for APPARATUS AND METHOD OF CONTROL FUNCTION IN MOBILE STATION earlier filed in the Korean Intellectual Property Office on 3 Nov. 2003 and there duly assigned Serial No. 2003-77422.

BACKGROUND OF THE INVENTION

1. Field of the Invention

The present invention relates to an apparatus and method for controlling functions of a camera and, more particularly, to an apparatus and method for controlling camera functions capable of protecting malicious use of the camera functions of a wireless terminal by automatically controlling the camera functions of the wireless terminal.

2. Description of the Related Art

Nowadays, a Wireless terminal has provided various services including a wireless communication service function, a wireless Internet service function, a short message service function and a camera function.

The camera function among such services of the wireless terminal is a function with which a subscriber photographs images using the wireless terminal, stores the photographed images in a storage unit, displays the images through a display unit according to a subscriber's request, or transmits the images through the Internet or other networks.

The camera function has a positive aspect that the subscribers are capable of being provided with a camera function through a wireless terminal without having a separate camera, and a negative aspect that their privacy may be infringed.

That is, the subscribers may infringe other people's privacy by photographing the other people's video information using the camera function of the wireless terminal without obtaining the other people's approval.

At this time, in the case that the subscriber photographs other people using the camera function of the wireless terminal, it becomes a social problem since the other people do not recognize that he or she is photographed.

As technology competition between companies becomes severe due to the development of an information-oriented society, there is needed protection from malicious use of the camera function of the wireless terminal.

That is, it is required to protect from photographing the technology and image of other company or other people and from flowing them out using the camera function of the wireless terminal.

In the case that the wireless terminal is maliciously used, a manager who is managing a company or a specific area has to integrally manage incoming or outgoing information on wireless terminals and solve such a problem using the information on the wireless terminals stored in the database.

SUMMARY OF THE INVENTION

It is the object of the present invention to provide an apparatus and method for controlling a wireless terminal, wherein a camera function of the wireless terminal is automatically turned off when the wireless terminal enters a house or specific area, and the camera function of the wireless terminal is automatically turned on when the wireless terminal goes out of the house or specific area, so that malicious use of the camera function of the wireless terminal is prohibited and incoming and outgoing information on the wireless terminal can be managed while a subscriber of the wireless terminal conveniently uses the camera function.

It is another object of the present invention to provide an apparatus and method for controlling the camera function of a wireless terminal, accommodating a prompt response to the malicious use of the wireless terminal being performed when the wireless terminal is maliciously used in houses or specific areas, so that a manager can search for the incoming and outgoing status information of each wireless terminal with ease.

It is yet another object of the present invention to provide an apparatus and method for controlling a camera function of a wireless terminal automatically, that can be implemented with ease and efficiency and yet be reliable and cost effective.

According to an aspect of the present invention, there is provided a system for controlling a wireless terminal, including: a signal transmission apparatus for generating a control signal including control information to control a function mode of the wireless terminal and transmitting the control signal, and at least one wireless terminal for setting a function mode according to the control information in the information included in the control signal when the control signal transmitted from the signal transmission apparatus is received.

Preferably, the signal transmission apparatus stores control information according to different communication schemes and periodically generates the control signal using the control information.

Preferably, the wireless terminal stores function setting information according to the control information, analyzes the control information of the received control signal, searches for the function setting information according to the control information and sets a function mode according to the corresponding function setting information.

According to another aspect of the present invention, there is provided a signal transmission apparatus for controlling a function of the wireless terminal, including: a storage unit for storing control information to control a function mode of a wireless terminal which uses different communication schemes; and a signal processing portion for generating a control signal according to the control information stored in the storage unit and transmitting the signal in a wireless scheme.

According to yet another aspect of the present invention, there is provided a wireless terminal, including: a storage unit for storing function setting information according to control information of a control signal received from a wireless network; a reception unit for receiving the control signal through a communication scheme and a frequency band which are set in the wireless terminal; a signal determination portion for recognizing control information included in a control signal received from the signal reception unit, searching for the function setting information according to the control information from the storage unit and providing a mode signal according to the search result; and a mode processing unit for setting a corresponding function mode according to the mode signal provided from the signal determination portion.

According to yet another aspect of the present invention, there is provided a method for controlling a function of a wireless terminal, including the steps of: (a) by a signal transmission apparatus, generating a control signal including control information to control the function of the wireless terminal and transmitting the control signal in a wireless scheme; and (b) setting a function mode according to the control information included in the control signal by the wireless terminal, when receiving the control signal.

Preferably, the method further includes the step of receiving and storing the control information controlling the function mode of each wireless terminal which uses different communication schemes by the signal transmission apparatus.

According to yet another aspect of the present invention, there is provided a method for transmitting a signal to control a function of a wireless terminal, including the steps of: (a) receiving and storing control information to control a function mode of the wireless terminal which uses different communication schemes; and (b) periodically generating a control signal including the stored control information, and transmitting the signal so as to be received by at least one wireless terminal.

According to yet another aspect of the present invention, there is provided a method for setting a mode of a wireless terminal, including the steps of: receiving and storing mode setting information according to control information of a control signal received in a communication scheme and a frequency band which are used by the wireless terminal; recognizing the control information of the control signal received from a signal transmission apparatus in the communication scheme and frequency band; and searching for the mode setting information according to the control information and setting a mode according to the searched mode setting information.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 4 is a diagram for explaining a WCDMA protocol table in accordance with the present invention;

DETAILED DESCRIPTION OF THE INVENTION

A preferred embodiment of the present invention will be described herein below with reference to the accompanying drawings. In the following description, well-know function or construction are not described in detail since they would obscure the invention in unnecessary detail.

Figure 1:
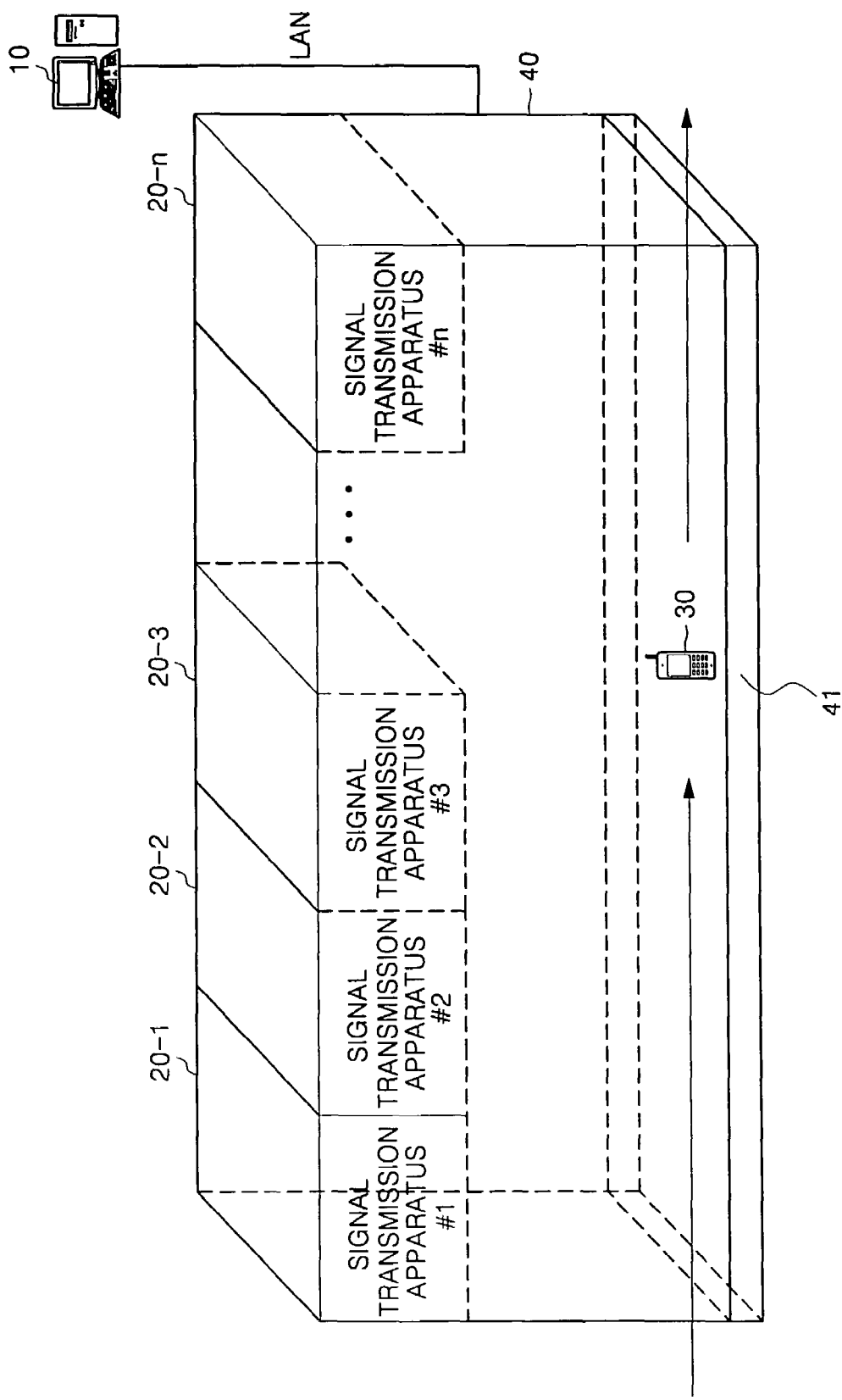
FIG. 1 is an entire block diagram for explaining a construction of a system for controlling a wireless terminal in accordance with a preferred embodiment of the present invention.

FIG. 1 is an entire block diagram for explaining a construction of a system for controlling a wireless terminal in accordance with a preferred embodiment of the present invention.

Referring to FIG. 1, the system for controlling the wireless terminal includes a management server 10 and a plurality of signal transmission apparatuses 20.

At this time, the management server 10 and the plurality of signal transmission apparatuses 20 can be connected by a wired/wireless network, and the detailed description explains the case that the server 10 and the plurality of signal transmission apparatuses 20 are connected by a LAN (Local Area Network).

The management server 10 transmits parameter information and frequency band information according to each protocol in order that the signal transmission apparatuses 20 can transmit a camera control signal to control a camera function of the wireless terminal 30 according to the setting of a manager.

The system includes a case 40 having a signal blocking function to prevent a signal transmitted from a base station for an external wireless communication from inflowing into the system and a transfer unit 41 for transferring the wireless terminal 30.

At this time, it is desirable that the case 40 includes an inlet for inflowing the wireless terminal 30 and an outlet (not shown) for drawing off the wireless terminal, and a plurality of signal transmission apparatuses 20 are included in an upper inner part of the case 40, and the transfer unit 41 is included through a lower inner part of the case 40.

The management server 10 provides the signal transmission apparatus 20 with program information set by the manager in order that each signal transmission apparatus 20 generates control signals according to each of the protocols.

The plurality of signal transmission apparatuses 20 periodically transmit the control signal according to program information provided by the management server 10.

Here, the control signal transmitted by the plurality of signal transmission apparatuses 20 can be corresponded to a camera control signal to turn on/off a camera function of the wireless terminal 30, a network connection on/off control signal with which the wireless terminal 30 is connected to another terminal through a wireless network to have access to data, and a mute control signal which converts an incoming bell of the wireless terminal 30 to a mute mode and an incoming vibration control signal which converts the incoming bell of the wireless terminal 30 to a vibration mode. While a case that the camera function of the wireless terminal 30 is controlled will be explained in the following detailed description, the same is applied to a case that other functions of the wireless terminal 30 are controlled.

At this time, each signal transmission apparatus 20 generates a camera control signal to turn on/off the camera function of the wireless terminal 30 using the parameter information and frequency band information of the protocol received from the management server 10 of each signal transmission apparatus 20, and transmits the generated camera control signal to the wireless terminal 30.

Figure 2:
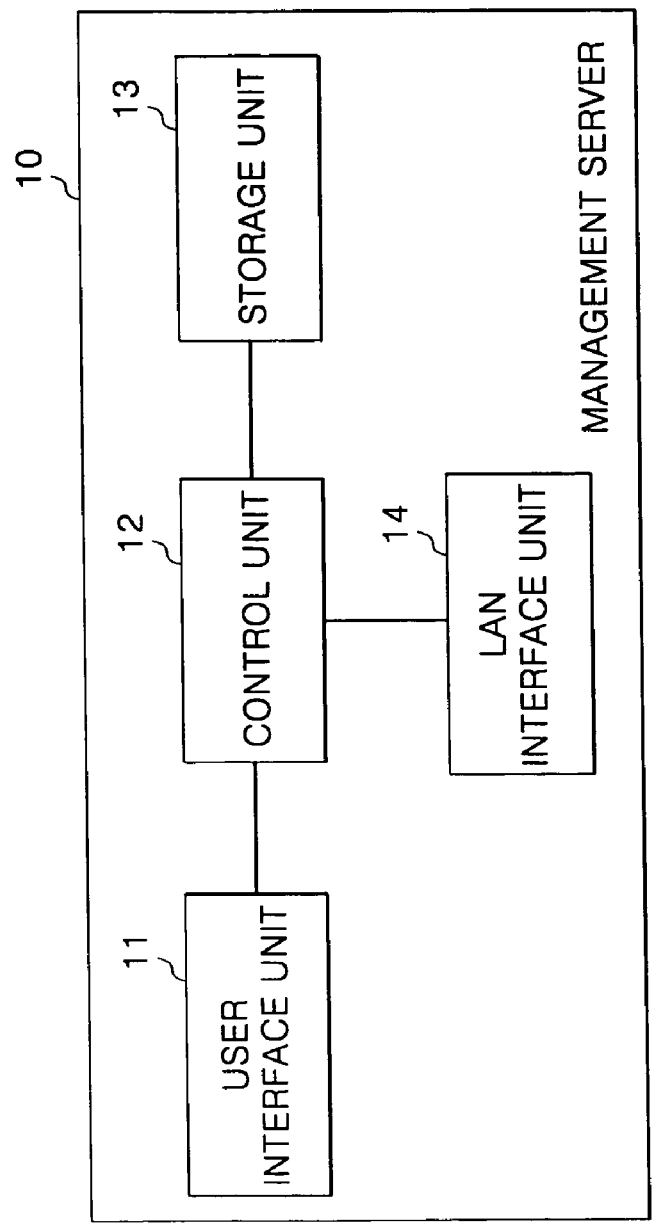
FIG. 2 is an internal block diagram for explaining an internal construction of a management server in accordance with a preferred embodiment of the present invention.

FIG. 2 is an internal block diagram for explaining an internal construction of a management server in accordance with a preferred embodiment of the present invention.

Referring to FIG. 2, the management server 10 includes a user's interface unit 11, a control unit 12, a LAN (local area network) interface unit 14, and a storage unit 13.

The user interface unit 11 provides program information set by a manager in order to control a camera function of the wireless terminal, parameter information and frequency band information according to each of the protocols.

At this time, a protocol used by each wireless terminal includes a CDMA (code-division multiple access) protocol, a WCDMA (Wideband-CDMA) protocol and a GSM (Global System for Mobile communication) protocol.

A digital communication scheme used in the wireless terminal 30 today can be divided into a TDMA (Time Division Multiple Access) scheme and a CDMA scheme.

The CDMA scheme is a division scheme on a code axis, wherein, using a spread spectrum technology, a predetermined frequency band is not divided by a channel, and each of the information in entire bands is divided by a specific code and transmitted on a transmission side, and only the same code spread information is extracted among much information in the entire bands and regenerated on a reception side.

A digital communication scheme tolerable to a fading phenomenon using a channel band width of about 5 MHz (megahertz) among the CDMA schemes is called a WCDMA scheme.

The TDMA scheme is a digital mobile phone scheme, wherein a predetermined frequency band is divided by time, and information to be transmitted is transmitted with a time lag in the transmission side, and information to be received is decoded with a time lag in the reception side. Moreover, a TDMA scheme used in Europe is called a GSM scheme.

The control unit 12 stores the program information provided from the manager through the user interface unit 11 in the storage unit 13 and transmits the parameter information and frequency band information to each signal transmission apparatus 20 according to the corresponding program information.

At this time, the control unit 12 generates a corresponding protocol table 13a and stores the generated protocol table 13a in the storage unit 13, using the parameter information and frequency band information according to each of the protocols provided from the manager.

Figure 3:
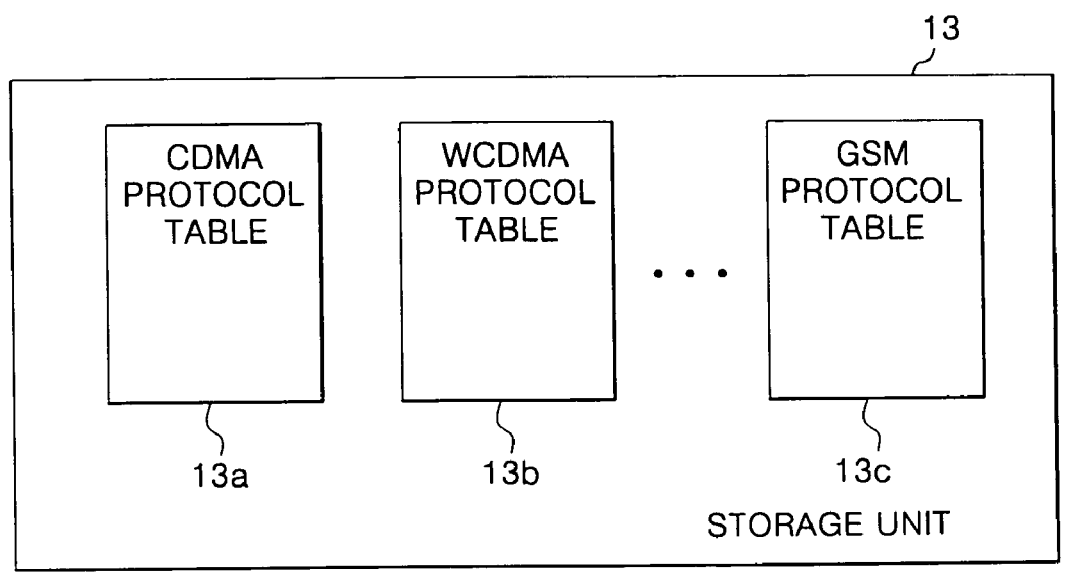
FIG. 3 is a diagram for explaining each protocol table stored in a storage unit in accordance with a preferred embodiment of the present invention.

FIG. 3 is a diagram for explaining each protocol table stored in a storage unit in accordance with a preferred embodiment of the present invention. Referring to FIG. 3, the storage unit 13 stores protocol tables 13a, 13b and 13c according to each of the protocols generated in the control unit 12.

That is, the control unit 12 generates each of the protocol tables 13a, 13b and 13c and stores the generated protocol tables 13a, 13b and 13c in the storage unit 13, using the parameter information and frequency band information according to each of the protocols received from the manager through the user interface unit 11.

At this time, each of the protocol tables 13a, 13b and 13c generated by the control unit 12 may be a CDMA protocol table 13a, a WCDMA protocol table 13b, or a GSM protocol table 13c.

Hereinafter, while a case that the wireless terminal uses the CDMA protocol, WCDMA protocol, or GSM protocol using an example is explained in the detailed description of the present invention, it is noted that the cases using other communication schemes or protocols are also included in the category of the present invention.

Here, the CDMA protocol table 13a has parameter information which is system information using the CDMA protocol, and the parameter information and frequency band information which controls a camera function.

At this time, the parameter information controlling the camera function is parameter information which is defined to control the camera function of the wireless terminal 30.

For example, a case that a 'System Parameter Message' among signals transmitted by the base station according to the CDMA protocol, which periodically transmits the system information to the wireless terminal 30 is used will be explained.

The 'System Parameter Message' is a message which is generated and transmitted every 1.28 seconds in order to transmit system information of the base station to the wireless terminal 30, and the message has a 4-bit field of 'BASE_CLASS'.

Such 'BASE_CLASS' field makes use of only values of '0000' and '0001' which are currently defined.

Table 1 is used to explain values defined in a current 'BASE_CLASS' field.

TABLE 1

| Value (binary) | Class of Service Provided |
|---|---|
| 0000 | Public Macrocellular System |
| 0001 | Public PCS System |

All other values are reserved.

As explained in Table 1, the current 'BASE_CLASS' field has defined only values of '0000' and '0001'.

That is, the base station sets the 'BASE_CLASS' field to a value of '0000' when the wireless communication system is a 'Public Macrocellular System', and to '0001' when the wireless communication system is a 'Public PCS (Personal Communication Service) system so that the base station generates the 'System Parameter Message' and transmits the generated 'System Parameter Message' to the wireless terminal 30.

Accordingly, a reserved field value in the 'BASE_CLASS' field value can be defined as a parameter to turn on/off the camera function.

Table 2 is used to explain a value newly defined in the 'BASE_CLASS' field in accordance with the present invention.

TABLE 2

| Value (binary) | Class of Service Provided |
|---|---|
| 0000 | Public Macrocellular System |
| 0001 | Public PCS System |
| 0010 | Public Macrocellular System, camera ON |
| 0011 | Public Macrocellular System, camera OFF |
| 0100 | Public PCS System, camera ON |
| 0101 | Public PCS System, camera OFF |

All other values are reserved

As explained in Table 2, in the reserved field of the 'BASE_CLASS', the '0010' field value can be defined as a 'Public Macrocellular System, camera ON' function, the '0011' field value can be defined as a 'Public Macrocellular System, camera OFF' function, the '0100' field value can be defined as a 'Public PCS System, camera ON' function, and the '0101' field value can be defined as a 'Public PCS System, camera OFF' function.

As another example, a case that a 'Sync Channel Message' among signals transmitted according to the CDMA protocol is used will be explained.

A 'PART' filed indicating paging channel transmission speed information in the 'Sync Channel Message', which the base station transmits to the wireless terminal 30 to perform synchronization is composed of 4 bits.

Table 3 is used to explain values defined in a current 'PART' field.

TABLE 3

| PART field (binary) | Paging Channel data rate |
| --- | --- |
| 0000 | 9600 bps (bits per second) |
| 0001 | 4800 bps |

All other values are reserved

As explained in Table 3, the 'PART' field indicating a paging channel transmission speed has defined '0000' and '0001' values only.

That is, the 'PART' field value of the 'Sync Channel Message' is set to '0000' and transmitted when the transmission speed of the paging channel is '9600 bps', and is set to '0001' and transmitted when the transmission speed of the paging channel is '4800 bps'.

Accordingly, the reserved field value in the 'PART' field value is defined as a parameter to turn on/off the camera function of the wireless terminal 30.

Table 4 is used to explain values newly defined in the 'PART' field.

TABLE 4

| PART field (binary) | Paging Channel data rate |
| --- | --- |
| 0000 | 9600 bps |
| 0001 | 4800 bps |
| 0010 | camera ON |
| 0011 | camera OFF |

All other values are reserved

As explained in Table 4, when the 'PART' field value of the 'Sync Channel Message' is '0010', it is defined as 'camera ON' function, and when the field value is '0011' it is defined as 'camera OFF' function.

On the other hand, the WCDMA protocol table (13b) has parameter information being system information using the WCDMA protocol, and the parameter information and frequency band information for controlling the camera function.

As another example, a case that an SIB (System Information Block) to transmit system information among signals transmitted according to the WCDMA protocol to the wireless terminal 30 is used will be explained.

At this time, a signal to transmit the system information according to the WCDMA protocol broadcasts 30 types of SIB to each wireless terminal 30.

Such an SIB is composed of 5 bits.

FIG. 4 is a diagram for explaining a WCDMA protocol table in accordance with the present invention.

As described in FIG. 4, the base station using the WCDMA protocol is constituted of 30 types of SIB to transmit the system information and a newly defined type (type 19) to control the camera function.

The base station generates the SIB after including a system information parameter into an information element of each type of SIB, and transmits the generated SIB to the wireless terminal 30 in a broadcast scheme.

The wireless terminal 30 using the WCDMA protocol analyzes the received SIB of 5 bits and recognizes the system information parameter loaded in the information element.

That is, the wireless terminal 30 can analyze the parameter information of the element and determine whether the information is a camera ON message or a camera OFF message when the received SIB is the 'Type 19'.

The GSM protocol table 13c has the system parameter information according to the GSM protocol, and the parameter information and frequency band information to control the camera function.

For example, in the case that a 'SYS_INFO Message' of a BSSH (Broadcast Control Channel) to transmit system information among signals to be transmitted according to the GSM protocol is used, the manager can define a parameter value which is not defined in the 'SYS_INFO Message' as a camera control parameter value.

In other words, each of the protocol tables 13a, 13b and 13c has a parameter information of each protocol, parameter information and frequency band information defined by the manager to control the camera function.

At this time, the parameter information defined by the manager to control the camera function can use undefined parameter information among messages transmitted to the terminal by the base station according to each protocol.

The LAN interface unit 14 of the management server 10 performs an interfacing function in order that the control unit 12 can transmit the parameter information and frequency band information according to each protocol to each signal transmission apparatus 20 through the LAN.

Figure 5:
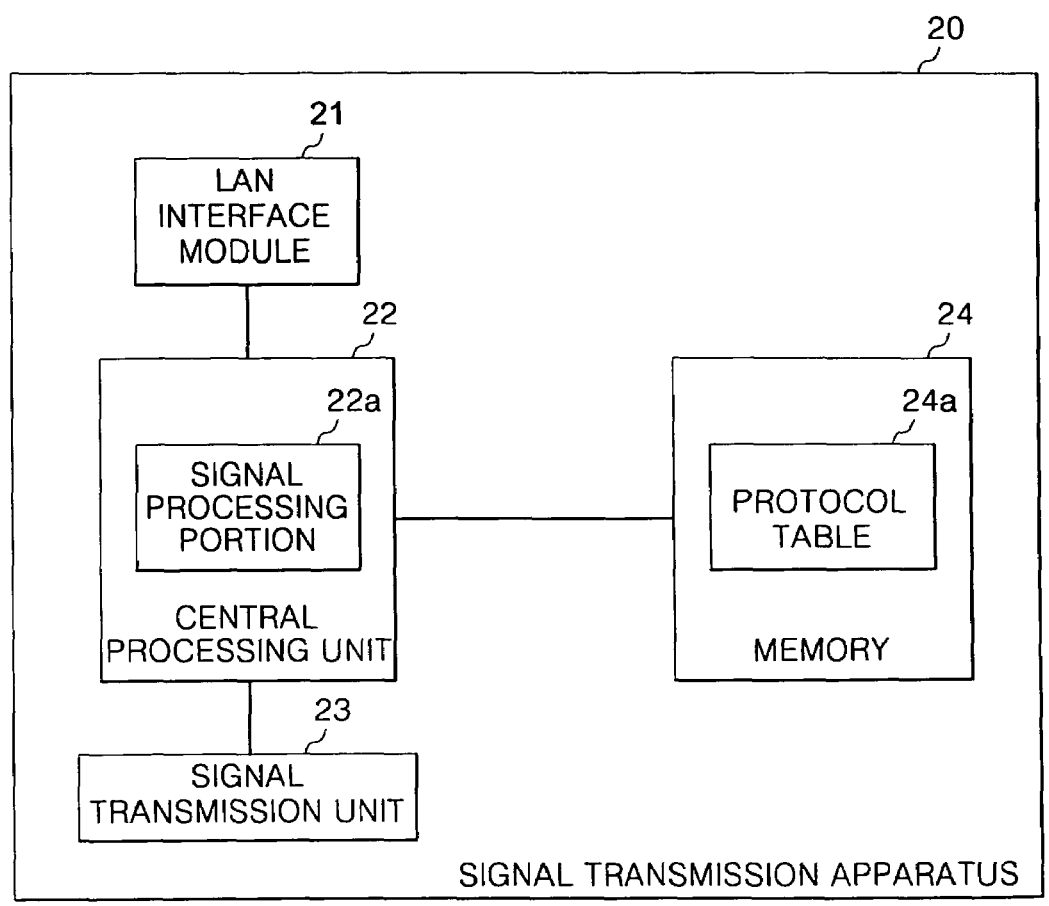
FIG. 5 is an internal block diagram for explaining an internal construction of a signal transmission apparatus in accordance with a preferred embodiment of the present invention.

FIG. 5 is an internal block diagram for explaining an internal construction of a signal transmission apparatus in accordance with a preferred embodiment of the present invention.

Referring to FIG. 5, the signal transmission apparatus 20 includes a LAN interface module 21, a central processing unit 22, a memory 24 and a signal transmission unit 23. Moreover, the central processing unit 22 includes a signal processing portion 22a.

The LAN interface module 21 receives the parameter information and frequency band information from the management server 10 through the LAN (local area network).

The signal processing portion 22a of the central processing unit 22 generates a protocol table 24a and stores the generated protocol table 24a in the memory 24, using the parameter information and frequency band information received from the management server 10 through the LAN interface module 21.

At this time, the protocol table 24a generated by the signal processing portion 22a of each signal transmission apparatus 20 can be corresponded to the CDMA protocol table, the WCDMA protocol table and the GSM protocol table in accordance with the protocol parameter information received from the management server 10 by each signal transmission apparatus 20.

The signal processing portion 22a generates a camera control signal and provides the signal transmission unit 23 with the generated camera control signal, using the protocol table 24a stored in the memory 24.

The signal transmission unit 23 wirelessly transmits the camera control signal provided from the signal processing portion 22a according to the frequency band information received from the management server 10.

That is, the wireless terminal 30 can obtain the camera control signal by transmitting the camera control signal to the frequency band used by the wireless terminal 30 using the corresponding protocol.

For example, the signal processing portion 22a generates the CDMA protocol table 24a including parameter information defined to control the camera function as shown in FIGS. 2 and 4 and stores the generated CDMA protocol table 24a in the memory 24 when the protocol parameter information received from the management server 10 is the parameter information of the CDMA protocol.

At first, in the case that the signal processing portion 22a controls the camera function using the 'System Parameter Message' as shown in Table 2, the signal processing portion 22a receives the information on the CDMA protocol parameter including the parameter information and frequency band defined as Table 2 from the management server 10, generates the CDMA protocol table 24a, and stores the generated CDMA protocol table 24a in the memory 24.

The signal processing portion 22a sets the value of the 'BASE_CLASS' field according to setting of the management server 10 when the 'System Parameter Message' to transmit the system information to the wireless terminal 30 is generated.

That is, the signal processing portion 22a sets the value of the 'BASE_CLASS' field to '0010' or '0100' when the camera function "ON" of the wireless terminal 30 is set from the management server 10.

At this time, the signal processing portion 22a sets the value of the 'BASE_CLASS' field to '0010' when a system of the wireless terminal 30 is the 'Public Macrocellular System', and sets the value of the 'BASE_CLASS' field to '0100' when the system is the 'Public PCS System'.

The signal processing portion 22a sets the value of the 'BASE_CLASS' field and generates the 'System Parameter Message', and wirelessly transmits the generated 'System Parameter Message' through the signal transmission unit 23.

On the other hand, the signal processing portion 22a sets the value of the 'BASE_CLASS' field to '0100' or '0101' when the camera function OFF of the wireless terminal 30 is set from the management server 10.

At this time, the signal processing portion 22a sets the value of the 'BASE_CLASS' field to '0100' when the system of the wireless terminal 30 is the 'Public Macrocellular System', and sets the value of the 'BASE_CLASS' field to '0101' when the system is the 'Public PCS System'.

As another example, the signal processing portion 22a sets the value of the 'BASE_CLASS' field and generates the 'System Parameter Message', and wirelessly transmits the generated 'System Parameter Message' through the signal transmission unit 23.

On the other hand, in the case that the signal processing portion 22a controls the camera function using the 'Sync Channel Message', the signal processing portion 22a receives the information on the CDMA protocol parameter including the parameter information and frequency band information defined in Table 4 from the management server 10, and generates the CDMA protocol table 24a, and stores the generated CDMA protocol message in the memory 24, as shown in FIG. 4.

In the case that the camera function "ON" is set from the management server 10, when the 'Sync Channel Message' to synchronize channel speeds is generated, the signal processing portion 22a sets the value of the 'PART' field to '0010', and in the case that the camera function "OFF" is set, the signal processing portion 22a sets the value of the 'PART' field to '0011' and generates the 'Sync Channel Message'.

The generated 'Sync Channel Message' is wirelessly transmitted through the signal transmission unit 23.

As another example, when the protocol parameter information received from the management server 10 is the parameter information of the WCDMA protocol, the signal processing portion 22a generates the CDMA protocol table 24a including parameter information of the type (Type 19) defined to control the camera function, and stores the generated CDMA protocol table 24a in the memory 24, as shown in FIG. 4.

In the case that the camera function "ON" is set from the management server 10, when the signal processing portion 22a generates the SIB used to transmit the system information to the wireless terminal 30, the signal processing portion 22a sets the camera function "ON" in an element of the camera function control type (Type 19) and generates the SIB, and in the case that the camera function "OFF" is set from the management server 10, the signal processing portion 22a sets the camera function "OFF" in the element of the camera function control type (Type 19) and generates the SIB.

The signal processing portion 22a wirelessly transmits the generated SIB through the signal transmission unit 23 in order to transmit the system information to the wireless terminal 30.

The signal processing portion 22a receives the parameter information from the management server 10, generates the 'SYS_INFO Message' together with the parameter information defined to control the camera function when the generated protocol table 24a is the GSM protocol table, and transmits the camera control signal including the generated 'SYS_INFO Message'.

Figure 6:
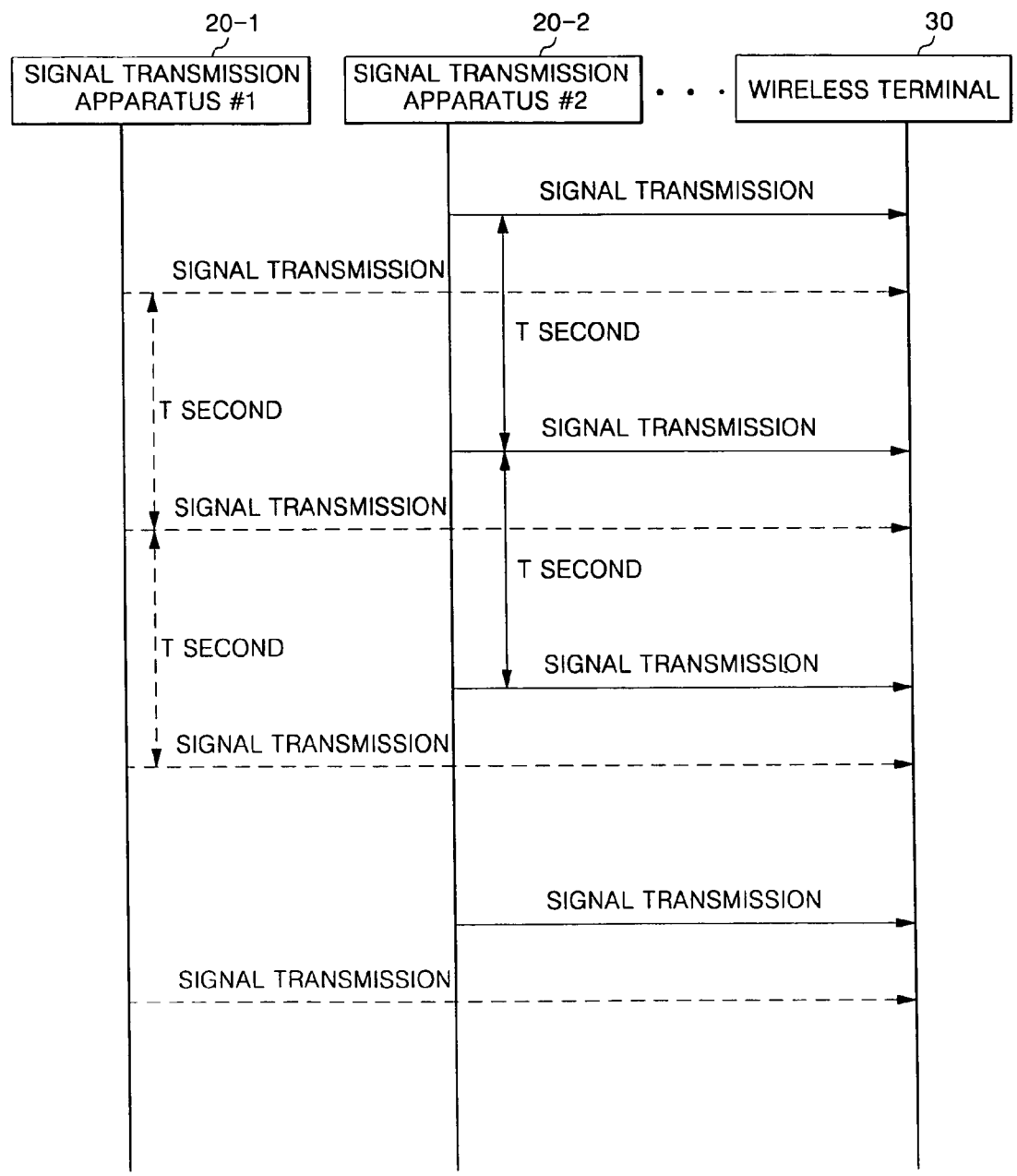
FIG. 6 is a flow chart explaining how a signal transmission apparatus in accordance with the present invention transmits a camera control message.

FIG. 6 is a flow chart explaining how a signal transmission apparatus in accordance with the present invention transmits a camera control signal.

Referring to FIG. 6, the signal processing portion 22a of each signal transmission apparatus 20 generates a camera control signal to control a camera control function of the wireless terminal 30 every 'T' seconds with reference to a protocol table 24a stored in the memory 24, and transmits the generated camera control signal through the signal transmission unit 23.

That is, the signal transmission apparatus #1 (20-1) generates the camera control signal according to the CDMA protocol every 'T' seconds and wirelessly transmits the signal, and the signal transmission apparatus #2 (20-2) generates the camera control signal according to the WCDMA protocol every 'T' seconds and wirelessly transmits the signal, and the signal transmission apparatus #3 (20-3) generates the camera control signal according to the GSM protocol every 'T' seconds and wirelessly transmits the signal.

At this time, each signal transmission apparatus 20 repeatedly generates the camera control signal in a predetermined period according to each protocol set from the management server 10 in order to control the camera functions of a plurality of wireless terminal 30 which use the same protocols continuously or non-continuously, without controlling the camera function of one of the wireless terminal 30.

Figure 7:
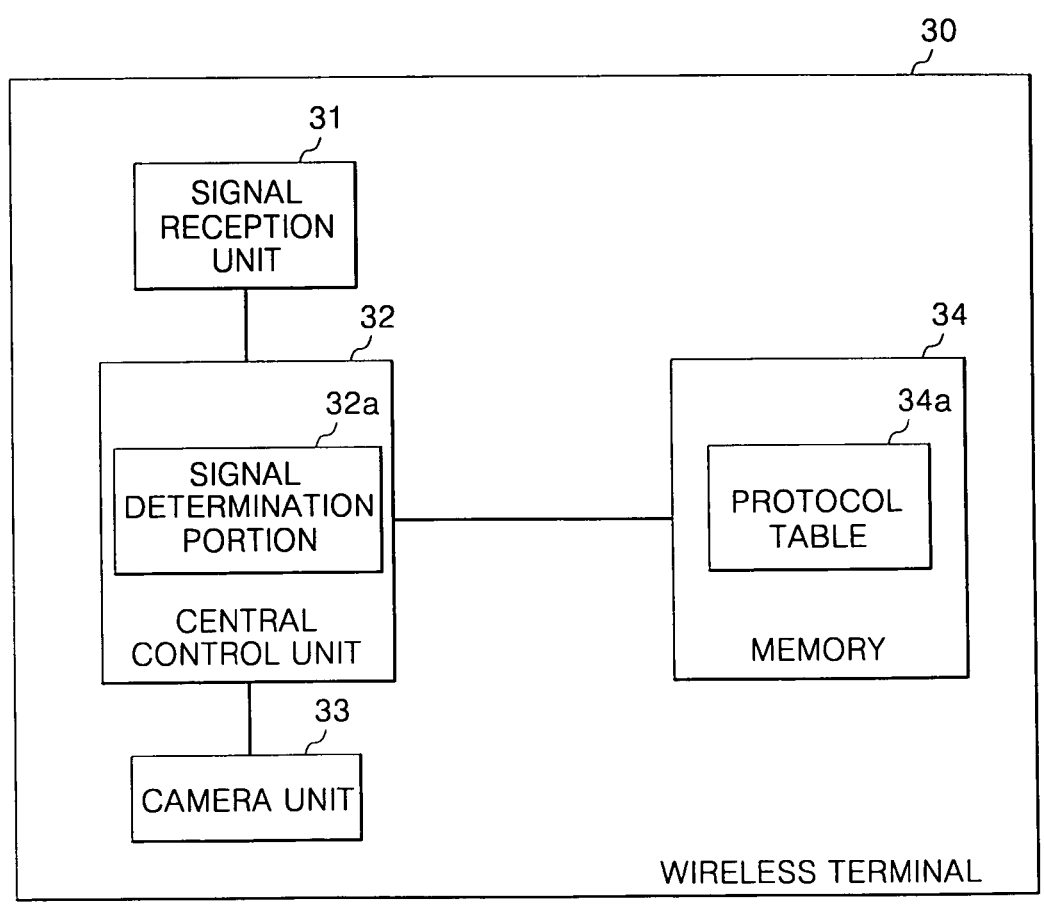
FIG. 7 is an internal block diagram for explaining an internal construction of a wireless terminal in accordance with a preferred embodiment of the present invention.

FIG. 7 is an internal block diagram for explaining an internal construction of a wireless terminal in accordance with a preferred embodiment of the present invention.

Referring to FIG. 7, the wireless terminal 30 includes a signal reception unit 31, a central control unit 32, a memory 34 and a camera unit 33.

The central control unit 32 includes a signal determination portion 32a.

The signal reception unit 31 wirelessly receives a message from the signal transmission apparatus 20. At this time, the signal reception unit 31 receives only a signal that is received with a frequency band used according to a protocol that the wireless terminal 30 uses.

That is, the signal reception unit 31 receives only a signal received through a protocol and a frequency band used by the corresponding wireless terminal 30, so that it is not affected by signals using other protocols and frequency bands.

The memory 34 stores a protocol table 34*a*, and the protocol table 34*a* can set parameter information according to a protocol used by the corresponding wireless terminal 30 and parameter information to control the camera function when a manufacturer of the wireless terminal 30 manufactures or designs the protocol table 34*a*.

The user of the wireless terminal 30 can upgrade the parameter information to control the camera function, and at this time, a server to upgrade the parameter information can be connected through wired/wireless networks.

That is, in the case that the wireless terminal 30 uses the CDMA protocol, the CDMA protocol table 34*a* including the parameter defined to control the camera is set as described in Table 2 or Table 4, and in the case of using the WCDMA protocol, the WCDMA protocol table 34*a* in which the type to control the camera (Type 19) is defined is set as described in Table 4.

In the case that the wireless terminal 30 uses the GSM protocol, the GSM protocol table 34*a* including the parameter information which is defined to control the camera function among messages received through BCCH (broadcast control channel) is set.

At this time, it is desirable that the parameter information of the protocol tables 34*a* set in the wireless terminal 30 using each protocol, and the parameter information of each of the protocol tables 24*a* generated by each of the signal transmission apparatuses 20 when the manager provides the signal transmission apparatus 20 with the parameter information through the management server 10 are set in the same manner.

The signal determination portion 32*a* of the central control unit 32 recognizes parameter information of a signal received through the signal reception unit 31, and sets the recognized parameter information in the wireless terminal 30 as a corresponding function with reference to the protocol table 34*a* stored in the memory 34.

That is, when there is parameter information to turn on/off the camera function among message parameter information of the signal received from the signal transmission apparatus 20, the signal determination portion 32*a* generates the camera on/off control signal and provides the camera unit 33 with the signal.

For example, in the case that the wireless terminal 30 uses the CDMA protocol, the signal determination portion 32*a* recognizes a value of the 'BASE_CLASS' field of the 'System Parameter Message' received from the signal transmission apparatus #1 (20-1). In addition, when the value of the 'BASE_CLASS' field is set to '0010', the signal determination portion 32*a* determines it as a camera control signal to turn "ON" the camera function in the state of the 'Public Macrocellular System', and generates the camera "ON" control signal.

When the 'BASE_CLASS' field is set to '0010', the signal determination portion 32*a* determines it as a camera control signal to turn "OFF" the camera function in the state of 'Public Macrocellular System', generates the camera "OFF" control signal, and provides the camera unit 33 with the generated camera on/off control signal.

On the other hand, when the value of the 'BASE_CLASS' field is set to '0100', the signal determination portion 32*a* determines it as a camera control message to turn "ON" the camera function in the state of the 'Public PCS System' and generates the camera ON control signal. Moreover, when the 'BASE_CLASS' field is set to '0101', the signal determination portion 32*a* determines it as a camera control signal to turn "OFF" the camera function in the state of the 'Public PCS Message', generates the camera "OFF" control signal, and provides the camera unit 33 with the generated camera on/off control signal.

In the case that the wireless terminal 30 uses the CDMA protocol, when a value of the 'PART' field of the 'Sync Channel Message' received from the signal transmission apparatus #1 (20-1) is set to '0010', the signal determination portion 32*a* determines it as a camera control signal to turn "ON" the camera function and generates the camera "ON" control signal. In addition, when the 'PART' field of the 'Sync Channel Message' is set to '0011', the signal determination portion 32*a* determines it as the camera control signal to turn "OFF" the camera function, generates the camera "OFF" control signal, and provides the camera unit 33 with the generated camera on/off control signal.

On the other hand, when the wireless terminal 30 uses the WCDMA protocol, the signal determination portion 32*a* recognizes whether the SIB received from the signal transmission apparatus #2 (20-2) is a new camera function control type (Type 19). Moreover, in the case of the camera function control type, the signal determination portion 32*a* determines whether the SIB is the camera on/off message with reference to an information element of the received SIB When the element of the received camera control type (Type 19) includes the 'camera ON', the signal determination portion 32*a* generates the camera "ON" control signal. Furthermore, when the element includes the 'camera OFF', the determination unit 32*a* generates the camera "OFF" control signal, and provides the camera unit 33 with the generated camera on/off control signal.

On the other hand, when the wireless terminal 30 uses the GSM protocol, the signal determination portion 32*a* recognizes the parameter information of the 'SYS_INFO Message' received from the signal transmission apparatus #3 (20-3), and determines whether the parameter information is the camera "ON" parameter information or the camera "OFF" parameter information.

When there is the camera "ON" parameter information in the received 'SYS_INFO Message', the signal determination portion 32*a* generates the camera "ON" control signal. Moreover, when there is the camera "OFF" parameter information in the 'SYS_INFO Message', the signal determination portion 32*a* generates the camera "OFF" control signal and provides the camera unit 33 with the generated camera on/off control signal.

The camera unit 33 takes a photograph of visible light, transmits image information to the central control unit 32, and displays an image signal according to the display signal received from the central control unit 32.

The camera unit 33 turns on the camera function when the camera "ON" control signal is provided from the signal determination portion 32*a*, and turns off the camera function when the camera "OFF" control signal is received.

In the case that the image signal is received from the camera unit 33, the central control unit 32 stores the corresponding image signal in the memory 24, and provides the display signal according to the corresponding image signal in compliance with user requirements.

At this time, the central control unit 32 provides the camera unit 33 or terminals connected to other networks with the display signal according to the image signal stored in the memory 24 in compliance with user requirements.

Figure 8:
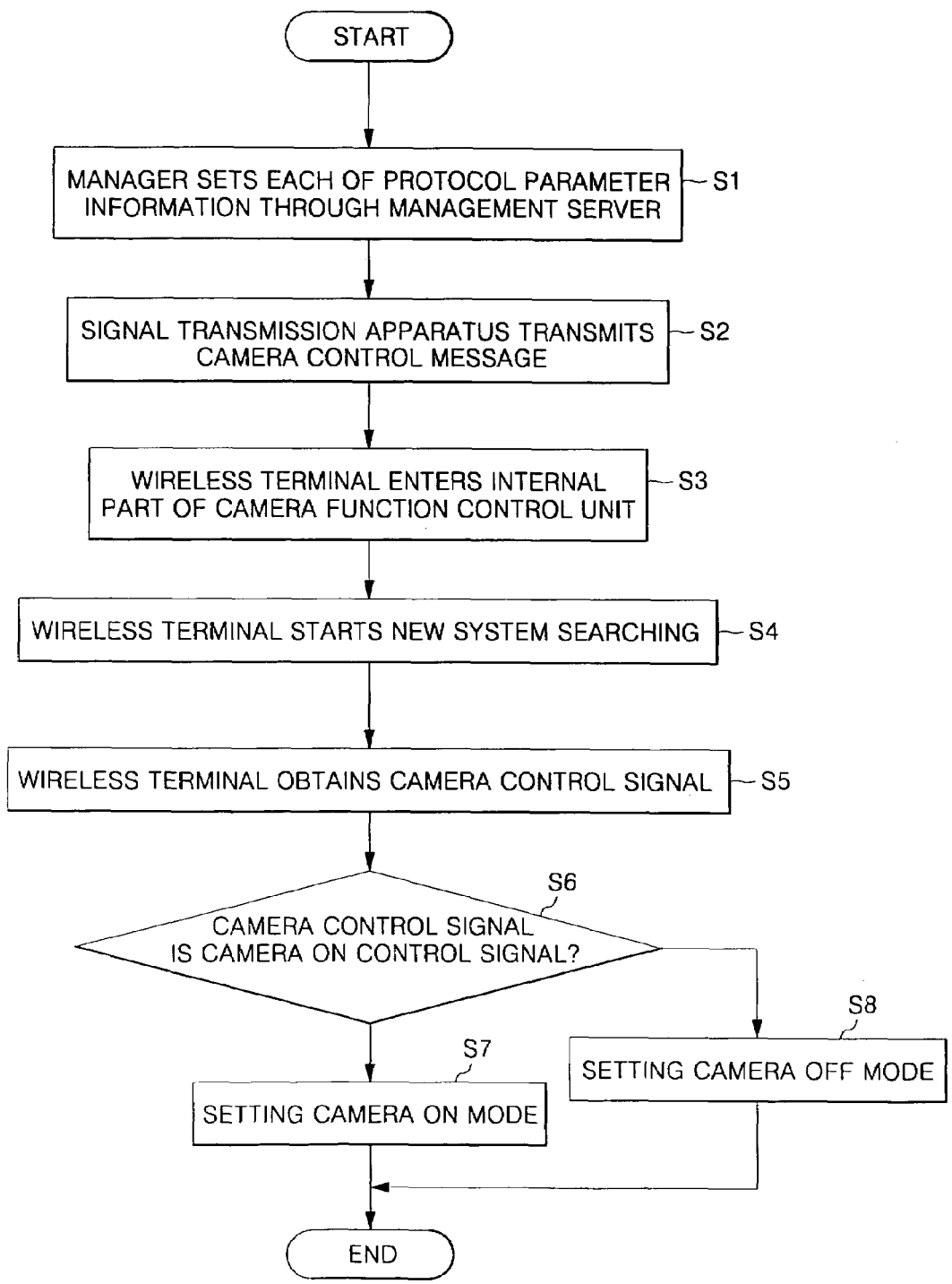
FIG. 8 is a flow chart explaining a method for controlling a camera function of a wireless terminal in accordance with a preferred embodiment of the present invention.

FIG. 8 is a flow chart explaining a method for controlling a camera function of a wireless terminal in accordance with a preferred embodiment of the present invention.

Referring to FIG. 8, when a manager sets parameter information and frequency band information of each of the protocols through a user interface unit 11 of a management server 10, a control unit 12 generates the corresponding protocol tables 13a, 13b and 13c using the parameter information and frequency band information set by the manager and stores the tables in a storage unit 13 (S1).

That is, when the manager sets the information on the CDMA protocol parameter and frequency band through the user interface unit 11, the control unit 12 generates the CDMA protocol table 13a whose camera control function is defined as shown in Table 2 or Table 4. Additionally, when the manager sets the information on the WCDMA protocol parameter and frequency band through the user interface unit 11, the control unit 12 generates the WCDMA protocol table 13b whose type (Type 19) having a camera control function is defined as shown in FIG. 4.

When the manager sets the information on the GSM protocol parameter and frequency band through the user interface unit 11, the manager generates the GSM protocol table 13c including the parameter information defined to control the camera function.

The control unit 12 of the management server 10 determines protocols to be used by each signal transmission apparatus 20 connected to a LAN according to manager's setting or program information, and transmits the parameter information and frequency band information of the corresponding protocol tables 13a, 13b and 13c to each signal transmission apparatus 20.

For example, when the control unit 12 sets the signal transmission apparatus #1 (20-1) as the CDMA protocol, the signal transmission apparatus #2 (20-2) as the WCDMA protocol, and the signal transmission apparatus #3 (20-3) as the GSM protocol, the control unit 12 transmits the parameter information of the CDMA protocol table 13a to the signal transmission apparatus #1 (20-1), the parameter information of the WCDMA protocol table 13b to the signal transmission apparatus #2 (20-2), and the parameter information of the GSM protocol table 13c to the signal transmission apparatus #3 (20-3).

At this time, it is desirable that the management server 10 transmits to each signal transmission apparatus 20 whether the camera "ON" control signal or the camera "OFF" control signal should be generated according to the user's setting, which is to generate the camera "OFF" control signal when the wireless terminal 30 enters houses or specific areas and generate the camera "ON" control signal when the wireless terminal 30 is out of the houses or specific area.

Each signal transmission apparatus 20 generates the corresponding protocol table 24a using the protocol parameter information received from the management server 10 and stores the table in the memory 24.

Each signal transmission apparatus 20 generates the camera control signal with reference to the protocol table 24a stored in the memory 24 and transmits the generated camera control signal (S2).

That is, the signal processing portion 22a of the signal transmission apparatus #1 (20-1) generates the CDMA protocol table 24a using the parameter information received from the management server 10 through a LAN interface module 21, and stores the generated CDMA protocol table 24a in the memory 24.

The signal processing portion 22a generates the camera control signal with reference to the CDMA protocol table 24a stored in the memory 24, and transmits the generated camera control signal to the signal transmission unit 23.

At this time, when the signal processing portion 22a receives the parameter information from the management server 10 and generates the 'System Parameter Message' to periodically transmit the system information to the wireless terminal 30 in the case that the generated CDMA protocol table 24a uses the value of the 'BASE_CLASS' field of the 'System Parameter Message' as shown in FIG. 2, the signal processing portion 22a sets a value of the 'BASE_CLASS' field and generates the camera control signal.

When the camera "ON" control signal is generated according to the manager's setting, the signal processing portion 22a sets the value of the "BASE_CLASS' field to '0010' in the case of 'Public Macrocellular System', and sets the value of the 'BASE_CLASS' field to '0100' in the case of 'Public PCS System', and then generates the camera control signal.

On the other hand, when the camera "OFF" control signal is generated according to the manager's setting, the signal processing portion 22a sets the value of the 'BASE_CLASS' field to '0011' in the case of 'Public Macrocellular System', and sets the value of the "BASE_CLASS' field to '0101' in the case of 'Public PCS System', and then generates the camera control signal.

In the case of using the 'Sync Channel Message', the signal transmission apparatus #1 (20-1) sets the value of the 'PART' field and generates the camera control signal when generating the 'Sync Channel Message' to be periodically transmitted to the wireless terminal 30 in order to make the synchronization of channel speeds, as shown in FIG. 4.

That is, the camera control signal is generated by setting the value of the ''PART' field to '0010' in the case that the camera "ON" control signal is generated according to the manager's setting, and the 'Sync Channel Message' is generated by setting the value of the 'PART' field to '0011' in the case of generating the camera "OFF" control signal.

The signal processing portion 22a of the signal transmission apparatus #2 (20-2) generates the WCDMA protocol table 24a and stores the generated WCDMA protocol table 24a in the memory 24 using the parameter information received from the management server 10 through the LAN interface module 21.

The signal processing portion 22a generates the camera control signal with reference to the WCDMA protocol table 24a stored in the memory 24 and transmits the generated camera control signal through the signal transmission unit 23.

At this time, the signal processing portion 22a generates the camera control signal using the type (Type 19) defined by the manager to generate the camera control signal among types of the SIB generated to transmit the system information.

That is, the signal processing portion 22a generates the SIB that is a newly defined type (Type 19) with reference to the WCDMA protocol table 24a stored in the memory 24 and transmits the generated SIB.

At this time, the signal processing portion 22a can generate the camera control signal by loading the camera function "ON" parameter information on an Information Element area of the 'Type 19' of the SIB in the case that the camera "ON" control signal is generated according to the manager setting, or by loading the camera function "OFF" parameter information on the Information Element area of the 'Type 19' of the SIB in the case that the camera "OFF" control signal is generated according to the manager setting.

The signal processing portion 22a of the signal transmission apparatus #3 (20-3) generates the GSM protocol table 24a using the parameter information received from the management server 10 through the LAN interface module 21 and stores the generated GSM protocol table 24a in the memory 24.

The signal processing portion 22a generates the camera function "ON" signal or camera function "OFF" signal according to the manager setting with reference to the GSM protocol table 24a stored in the memory 24.

At this time, when generating the camera function "ON" signal according to the manager setting, the signal processing portion 22a generates the 'SYS_INFO Message' by loading the camera function "ON" parameter information, or the 'SYS_INFO Message' by loading the camera function "OFF" parameter information with reference to the GSM protocol table 24a stored in the memory 24, and then transmits the Message through the signal transmission unit 23.

When a subscriber using the wireless terminal 30 enters the houses or specific areas, he or she places the wireless terminal 30 in a transfer unit 41 of the wireless terminal camera function control unit positioned in their inlets.

The transfer unit 41 transfers the wireless terminal 30 into an internal part of the wireless terminal camera function control unit of the wireless terminal 30 through the inlet of a case 40 (S3).

At this time, when the case 40 of the camera function control unit performs a blocking function to intercept the signal, the wireless terminal 30 starts the search to receive signals from the new system (S4).

As a result of the search, a wireless channel between the wireless terminal 30 and the signal transmission apparatus 20 is set and the wireless terminal 30 obtains the camera control signal transmitted from the signal transmission apparatus 20 equipped in the case 40 (S5).

The wireless terminal 30 recognizes the parameter information of the obtained camera control signal, and then determines whether the camera control signal is the camera "ON" control signal or the camera OFF control signal (S6).

As a result of the determination, when the camera control signal obtained by the wireless terminal 30 is the camera "ON" control signal, the signal determination portion 32a generates the camera "ON" control signal and then provides the camera unit 33 with the control signal.

On receiving the camera "ON" control signal from the signal determination portion 32a, the camera unit 33 sets the camera "ON" mode (S7).

At this time, on receiving the camera "ON" control signal, the camera unit 33 converts a current camera mode to the camera "ON" mode in the case that the current camera mode is the camera "OFF" mode, and maintains the current camera "ON" mode in the case that the current camera mode is the camera "ON" mode.

On the other hand, as a result of the determination, when the camera control signal obtained by the wireless terminal 30 is the camera "OFF" control signal, the signal determination portion 32a generates the camera "OFF" control signal, and then provides the camera unit 33 with the control signal.

On receiving the camera "OFF" control signal from the signal determination portion 32a, the camera unit 33 sets the camera "OFF" mode (S8).

At this time, on receiving the camera "OFF" control signal, the camera unit 33 converts a current camera mode to the camera "OFF" mode in the case that the current camera mode is the camera "ON" mode, and maintains the current camera "OFF" mode in the case that the current camera mode is the camera "OFF" mode.

For example, in the case that the wireless terminal 30 uses the CDMA protocol, when the wireless terminal 30 enters the case 40 using the transfer unit 41, it cannot receive a system signal transmitted from an external CDMA protocol base station (not shown) because of the signal blocking function of the case 40.

Therefore, the wireless terminal 30 starts the search to receive the system signal from a new system, and then obtains the camera control signal transmitted from the signal transmission apparatus #1 (20-1).

At this time, the signal transmission apparatus #1 (20-1) transmits a camera control signal including a system signal according to the CDMA protocol and the camera control signal.

At first, in the case that the signal processing portion 22a of the signal transmission apparatus #1 (20-1) transmits the camera control signal using the 'System Parameter Message', the signal processing portion 22a of the signal transmission apparatus #1 (20-1) generates the camera "ON" control signal or the camera "OFF" control signal according to the manager setting, and transmits through the signal transmission unit 23.

At this time, the signal processing portion 22a sets a value of the 'BASE_CLASS' field to '0101' when a system of the wireless terminal 30 is the 'Public Macrocellular System', and sets the value of the 'BASE_CLASS' field to '0101' when the system is the 'Public PCS System'. Moreover, the signal processing portion 22a generates the camera "ON" control signal and transmits the generated camera "ON" control signal through the signal transmission unit 23.

On the other hand, the signal processing portion 22a sets the value of the 'BASE_CLASS' field to '0011' when the system of the wireless terminal 30 is the 'Public Macrocellular System', and sets the value of the 'BASE_CLASS' field to '0101' when the system of the wireless terminal 30 is the 'Public PCS System'. In addition, the signal processing portion 22a generates the camera "OFF" control signal and transmits the generated camera "OFF" control signal through the signal transmission unit 23.

When the obtained system signal is the 'System Parameter Message', the wireless terminal 30 using the CDMA protocol recognizes the value of the 'BASE_CLASS' field, and then searches for the function defined as the value of the recognized field in the CDMA protocol table 34a that has been stored in the memory 24.

That is, the signal determination portion 32a of the wireless terminal 30 recognizes the value of the 'BASE_CLASS' field of the camera control signal transmitted from the signal transmission apparatus #1 (20-1), and then determines the value of the field as the camera "ON" control signal when the value of the 'BASE_CLASS' field is '0010' or '0100'.

The signal determination portion 32a generates the camera "ON" control signal and then provides the camera unit 33 with the signal.

The camera unit 33 sets the camera "ON" mode when receiving the camera "ON" control signal from the signal determination portion 32a.

The signal determination portion 32a recognizes the value of the 'BASE_CLASS' field of the camera control signal transmitted from the signal transmission apparatus #1 (20-1). In addition, when the value of the 'BASE_CLASS' field is '0011' or '0101', the signal determination portion 32a determines the control signal as the camera "OFF" control signal, generates the camera "OFF" control signal, and provides the camera unit 33 with it.

The camera unit 33 sets the camera "OFF" mode when receiving the camera "OFF" control signal from the signal determination portion 32a.

On the other hand, in the case that the wireless terminal 30 uses the WCDMA protocol, when the wireless terminal 30 enters the internal part of the case 40 using the transfer unit 41, the wireless terminal 30 does not receive the system signal transmitted from an external WCDMA protocol base station (not shown) because of the signal blocking function of the case 40.

Therefore, the wireless terminal 30 starts the search to receive a system signal from a new system, and obtains the camera control signal including the system signal and the camera control signal transmitted from the signal transmission apparatus #2 (20-2) as a result of the determination.

At first, the signal processing portion 22a of the signal transmission apparatus #2 (20) generates the SIB by loading the camera "ON" parameter information or camera "OFF" parameter information on the information element of the newly defined type (Type 19) in order to control the camera according to the manager setting and transmits the generated SIB.

The signal determination portion 32a of the wireless terminal 30 using the WCDMA protocol analyzes the parameter information of the information element of the received SIB, and recognizes the camera control information.

The signal determination portion 32a generates the camera "ON" control signal and provides the camera unit 33 with the signal when the recognized camera control information is the camera "ON" control signal. On the contrary, the signal determination portion 32a generates the camera "OFF" control signal and transmits the camera unit 33 with the signal when the recognized camera control information is the camera "OFF" control signal.

The camera unit 33 sets the camera "ON" mode when the camera "ON" control signal is received from the signal determination portion 32a, and the camera "OFF" mode when the camera "OFF" control signal is received from the signal determination portion 32a.

On the other hand, in the case that the wireless terminal 30 uses the GSM protocol, when the wireless terminal 30 enters the internal part of the case 40 using the transfer unit 41, the wireless terminal 30 cannot receive the system signal transmitted from an external GSM protocol base station (not shown) because of the signal blocking function of the case 40.

Therefore, the wireless terminal 30 starts the search to receive the system signal from the new system, and obtains the camera control signal including the system signal and camera control signal transmitted from the signal transmission apparatus #3 (30-3) as a result of the determination.

At first, the signal processing portion 22a of the signal transmission apparatus #3 (20-3) generates the 'SYS_INFO Message' using newly defined parameter information to control the camera according to the manager setting, and transmits the generated 'SYS_INFO Message'.

At this time, the signal processing portion 22a generates the 'SYS_INFO Message' by loading the set camera function "ON" parameter information on the GSM protocol table 24a or by loading the camera function "OFF" parameter information on the GSM protocol table 24a, and transmits the message through the signal transmission unit 23.

The signal determination portion 32a of the wireless terminal 30 using the GSM protocol recognizes the parameter information of the received 'SYS_INFO Message', and determines whether the received camera control signal is the camera "ON" control signal or the camera "OFF" control signal.

The signal determination portion 32a generates the camera "ON" control signal and provides the camera unit 33 with the signal when the received camera control signal is the camera "ON" control signal, and generates the camera "OFF" control signal and provides the camera unit 33 with the signal when the received camera control signal is the camera "OFF" control signal.

The camera unit 33 sets the camera "ON" mode when the camera "ON" control signal is received from the signal determination portion 32a, and the camera "OFF" mode when the camera "OFF" control signal is received from the camera "OFF" control signal.

Figure 9:
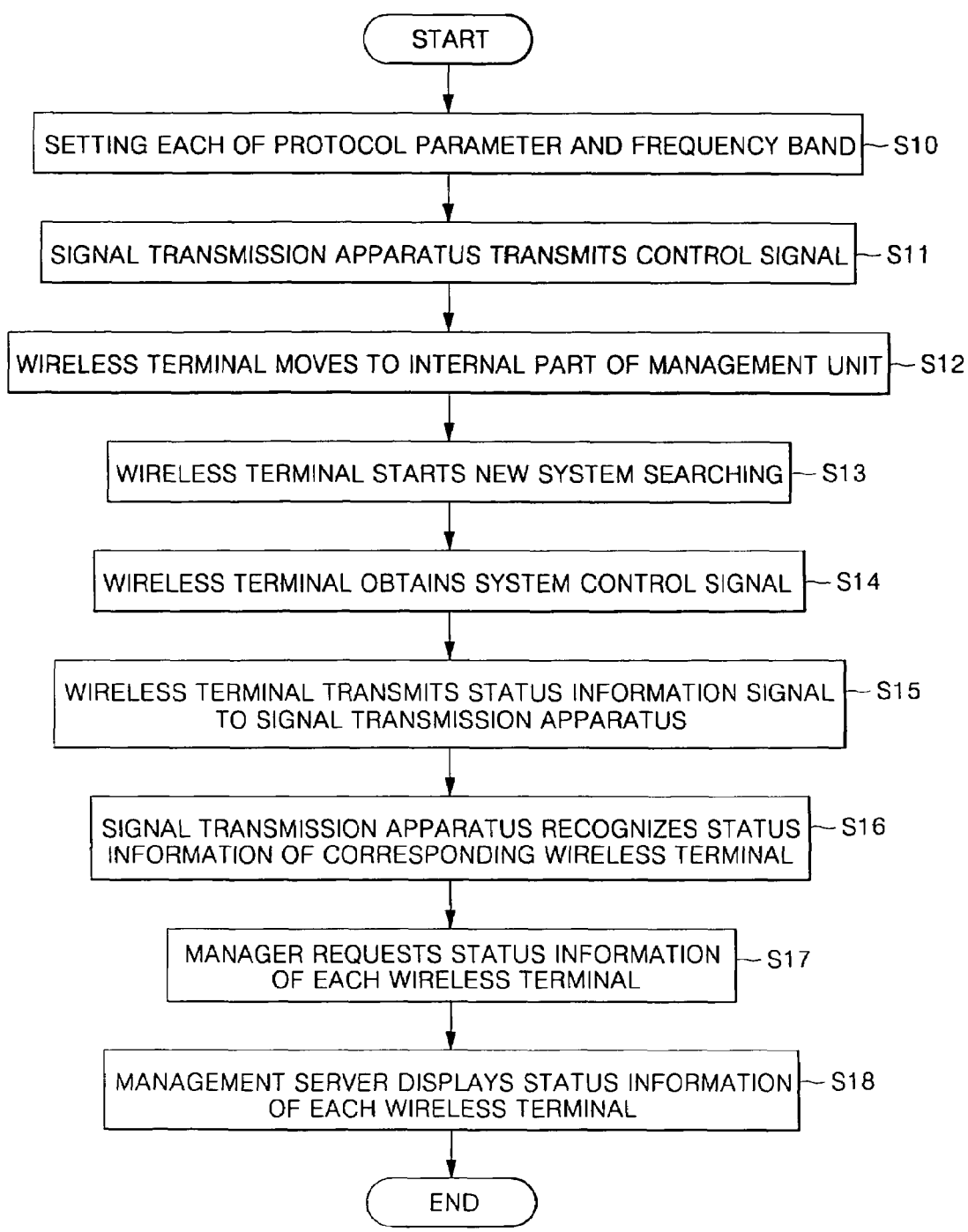
FIG. 9 is a flow chart explaining a method for managing status information of a wireless terminal in accordance with a preferred another embodiment of the present invention.

FIG. 9 is a flow chart explaining a method for managing status information of a wireless terminal in accordance with a preferred another embodiment of the present invention.

Referring to FIG. 9, in the case that the manager of the wireless terminal sets parameter information and frequency band information of each of the protocols through a user interface unit 11 of a management server 10, a control unit 12 generates corresponding protocol tables 13a, 13b and 13c using the parameter information and frequency band information set from the manager and stores the tables in a storage unit 13 (S10).

The control unit 12 of the management server 10 transmits the parameter information of each protocol to each signal transmission apparatus 20 according to the manager setting.

For example, when the signal transmission apparatuses #1 (20-1), #2 (20-2) and #3 (20-3) are set as the CDMA protocol, the WCDMA protocol and the GSM protocol, respectively, the control unit 12 transmits the parameter information of the CDMA protocol table 13a to the signal transmission apparatus #1 (20-1), the parameter information of the WCDMA protocol table 13b to the signal transmission apparatus #2 (20-2), and the parameter information of the GSM protocol table 13c to the signal transmission apparatus #3 (20-3).

Each signal transmission apparatus 20 generates the corresponding table 24a using the protocol parameter information received from the management server 10, and stores the table in a memory 24.

Each signal transmission apparatus 20 generates a system control signal with reference to the protocol table 24a stored in the memory 24, and transmits the generated system control signal (S11).

That is, the signal processing portion 22a of the signal transmission apparatus #1 (20-1) generates the CDMA protocol table 24a using the parameter information received from the management server 10 through the LAN interface module 21, and stores the generated CDMA protocol table 24a in the memory 24.

The signal processing portion 22a of the signal transmission apparatus #2 (20-2) generates a system control signal with reference to the WCDMA protocol table 24a stored in the memory 24, and transmits the generated system control signal through the signal transmission unit 23.

The signal processing portion 22a of the signal transmission apparatus #3 (20-3) generates the GSM protocol table 24a using the parameter information received from the management server 10 through the LAN interface module 21, and stores the generated GSM protocol table 24a in the memory 24.

The signal processing portion 22a generates a camera function "ON" signal or camera function "OFF" signal with reference to the GSM protocol table 24a stored in the memory 24 according to the manager setting.

When a subscriber using the wireless terminal 30 enters houses or specific areas, the wireless terminal 30 is placed in the transfer unit 41 of the wireless terminal camera function control unit installed in the inlet.

The transfer unit 41 transfers the wireless terminal 30 to the internal part of the wireless terminal management unit through the inlet of the case 40 (S12).

At this time, since the case 40 of the wireless terminal control unit performs the blocking function to intercept the signal, the wireless terminal 30 starts the search to receive the signal from a new system (S13).

As a result of the search, the wireless terminal 30 obtains the system control signal transmitted from the signal transmission apparatus 20 included in the case 40 (S14).

Such a wireless channel can be divided into a forward channel with which the signal transmission apparatus 20 transmits the system control signal to the wireless terminal 30, and a reverse channel with which the wireless terminal 30 transmits the status information signal to the signal transmission apparatus 20.

When receiving the system control signal, the wireless terminal 30 generates the status information signal using its status parameter information and transmits the generated status information signal to the signal transmission apparatus 20 through the reverse channel (S15).

The central processing unit 22 of the signal transmission apparatus 20 recognizes the parameter information of the status information signal received from the wireless terminal 30 and stores the status information of the corresponding wireless terminal 30 in the memory 24 (S16).

At this time, when establishing wireless channels and exchanging signals with a plurality of wireless terminals 30, the signal transmission apparatus 20 stores time information in which each wireless terminal 30 and the channel are set, and the status information of the wireless terminal 30 in which the corresponding time information is exchanged with the signal are stored in the memory 24.

In the case that the manager maliciously uses the wireless terminal 30 in the houses and specific areas, the control unit 12 of the management server 10 transmits a status information request signal of the wireless terminal 30 to each signal transmission apparatus 20 when the management information of the wireless terminal 30 is requested through the user interface unit 11 (S17) in order to search for the status information of the incoming and outgoing wireless terminal 30.

When the signal transmission apparatus 20 receives the status information request signal from the management server 10, it provides the status information and time information of the wireless terminal stored in the memory 24.

The control unit 12 of the management server 10 manages the status information and time information of each wireless terminal 30 provided by each signal transmission apparatus 20.

At this time, a method of how the control unit 12 manages each wireless terminal 30 may be a method of the corresponding wireless terminal 30 managing the status information of each wireless terminal 30 provided from each signal transmission apparatus 20 according to information on the time when the corresponding wireless terminal 30 enters and exits the houses or specific areas, or a method of each signal transmission apparatus 20 managing the status information of the wireless terminal 30 according to the kind of the protocol used.

In addition, a method of the control unit 12 managing each wireless terminal 30 provided from each transmission apparatus 20 according to the used frequency band may be used.

The control unit 12 stores the management information of each wireless terminal 30 in the storage unit 13, and provides a display signal in order that the manager can recognize the management information stored in the storage unit 13 through the user interface unit 11.

The user interface unit 11 displays the management information of each wireless terminal 30 according to the display signal provided from the control unit 12 (S18).

For example, the management server 10 transmits the management information request signal to each signal transmission apparatus 20 when the management information request of the wireless terminal 30 is received from the manager.

Each signal transmission apparatus 20 provides the management server 10 with the status information of the wireless terminal 30 stored in the memory 24.

That is, the signal transmission apparatus #1 (20-1) provides the status information of each wireless terminal using the CDMA protocol, and the signal transmission apparatus #2 (20-2) provides the status information of each wireless terminal 30 using the WCDMA protocol, and the signal transmission apparatus #3 (20-3) provides the status information of each wireless terminal 30 using the GSM protocol.

The management server 10 can divide the status information of each wireless terminal 30 provided from each signal transmission apparatus 20 into status information of each signal transmission apparatus 20 and of the wireless terminal 30 with which a wireless channel of the corresponding signal transmission apparatus 20 is set, and manage it.

At this time, the division of the status information of the wireless terminal 30 provided according to the signal transmission apparatus 20 can be performed according to the wireless terminal 30 using each protocol, or the frequency band with which each signal transmission apparatus 20 transmits the signal and the wireless terminal 30 using the corresponding frequency band when there are a plurality of signal transmission apparatus 20 using the same protocols.

The management server 10 displays the status information of each signal transmission apparatus 20 and the wireless terminal 30 in which the corresponding signal transmission apparatus 20 and the wireless channel are set through the user interface unit 11.

The management server 10 can manage the status information of each wireless terminal 30 provided from each signal transmission apparatus 20 by dividing it into the time information.

That is, the management server 10 can divide the time zone set by the manager, and manage the status information of the wireless terminal 30 to which the wireless channel is set in the corresponding time zone.

The management server 10 displays the status information of the wireless terminal 30 to which the wireless channel is set by the time zone through the user interface unit 11.

The present invention can be realized as computer-executable instructions in computer-readable media. The computer-readable media includes all possible kinds of media in which computer-readable data is stored or included or can include any type of data that can be read by a computer or a processing unit. The computer-readable media include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as flash memory or any other volatile or non-volatile memory, other semiconductor media, electronic media, electromagnetic media, infrared, and other communication media such as carrier waves (e.g., transmission via the Internet or another computer). Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable media can store and execute computer-readable codes that are distributed in computers connected via a network. The computer readable medium also includes cooperating or interconnected computer readable media that are in the processing system or are distributed among multiple processing systems that may be local or remote to the processing system. The present invention can include the computer-readable medium having stored thereon a data structure including a plurality of fields containing data representing the techniques of the present invention.

Figure 10:
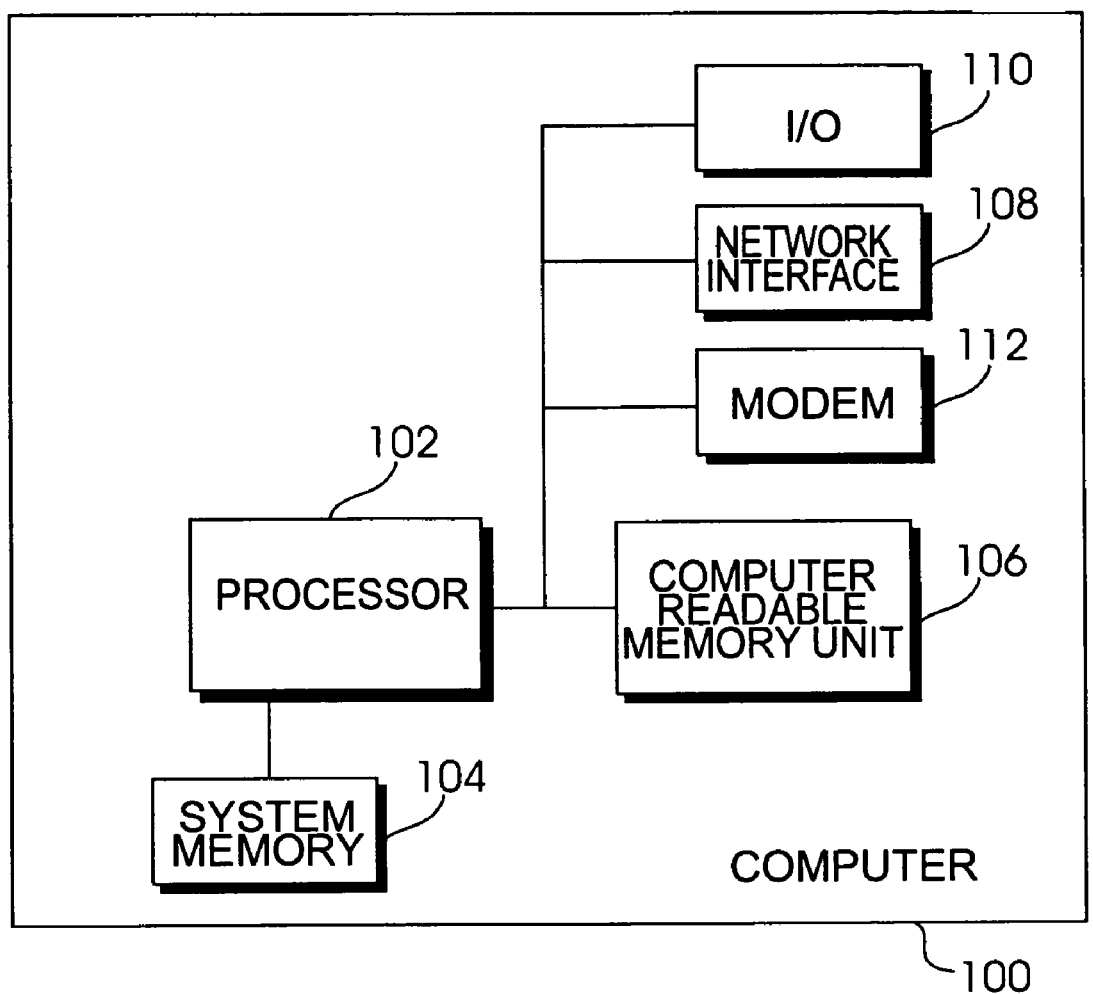
FIG. 10 shows an example of a computer including a computer-readable medium having computer-executable instructions for performing a technique of the present invention.

An example of a computer, but not limited to this example of the computer, that can read computer readable media that includes computer-executable instructions of the present invention is shown in FIG. 10. The computer 100 includes a processor 102 that controls the computer 100. The processor 102 uses the system memory 104 and a computer readable memory device 106 that includes certain computer readable recording media. A system bus connects the processor 102 to a network interface 108, modem 112 or other interface that accommodates a connection to another computer or network such as the Internet. The system bus may also include an input and output interface 110 that accommodates connection to a variety of other devices.

Although the preferred embodiments of the present invention have been disclosed for illustrative purposes, those skilled in the art appreciate that various modifications, additions and substitutions are possible, without departing from the scope and spirit of the invention as disclosed in the accompanying claims.

According to the present invention, there is an effect that an information leakage and an invasion of privacy can be protected by automatically controlling a camera function of the wireless terminal in the case that the camera function is maliciously used.

Also, there is an effect that the camera function is automatically controlled regardless of protocols (CDMA, WCDMA, GSM, etc.) used by the wireless terminal.

Moreover, there is an effect that a prompt response to the malicious use of the wireless terminal can be performed when the wireless terminal is maliciously used in houses or specific areas, so that a manager can search for the incoming and outgoing status information of each wireless terminal with ease.

What is claimed is:

1. A system for controlling a wireless terminal, comprising:
    a case having a signal blocking function to prevent the signal transmitted from a base station for an external wireless communication from inflowing into the system,
    a signal transmission apparatus for generating a control signal including control information to control a function mode of said wireless terminal and transmitting the control signal, and
        at least one wireless terminal for setting a function mode according to the control information in the information included in the control signal when the control signal transmitted from said signal transmission apparatus is received,
    wherein said function mode is a turning on and turning off of a camera contained in said wireless terminal when entering and leaving a designated area,
    wherein the control information is transmitted in fields in either a System Parameter Message, or a Sync Channel Message, or System Information Block, or a SYS_INFO Message in a CDMA (code-division multiple access), WCDMA (wideband code-division multiple access) and GSM (global system for mobile communication) protocol respectively.

2. The system according to claim 1, wherein said signal transmission apparatus stores control information according to different communication schemes and periodically generates the control signal using the control information.

3. The system according to claim 2, wherein the communication scheme is at least one of a global system for mobile telecommunication scheme, a code division multiple access communication scheme and a wideband code division multiple access communication scheme.

4. The scheme according to claim 1, wherein said signal transmission apparatus generates a control signal according to the code division multiple access communication scheme after including the control information in a reserved field of a BASE_CLASS field of a System Parameter Message or a PART field of a Sync Channel Message.

5. The system according to claim 1, wherein said signal transmission apparatus generates a control signal according to the wideband code division multiple access communication scheme after including the control information in a system information block type which is newly defined.

6. The system according to claim 1, wherein said signal transmission apparatus generates a control signal according to the global system for mobile communication scheme after including the control information in a reserved field of fields of a SYS_INFO message.

7. The system according to claim 1, wherein said wireless terminal stores function setting information according to the control information, analyzes the control information of the received control signal, searches for the function setting information according to the control information and sets a function mode according to the corresponding function setting information.

8. The system according to claim 1, wherein the function mode is at least one of a camera on or off mode of said wireless terminal, a network connection on or off mode where data is transmitted on the wireless network, and a mute mode or a vibration mode.

9. The system according to claim 1, wherein said signal transmission apparatus, comprises:
    a storage unit for storing control information to control a function mode of the wireless terminal which uses different communication schemes; and
    a signal processing portion for generating a control signal according to the control information stored in the storage unit and transmitting the signal in a wireless scheme.

10. A method of controlling a camera function of a wireless terminal, comprising:
    setting parameter information and frequency band information of each of a plurality of protocols through a user interface unit of a management server;
    when setting parameter information and frequency band information of each of the plurality of protocols, generating, by a control unit, the corresponding protocol tables using the parameter information and frequency band information set and storing the tables in a memory unit;
    generating said camera control signal by each of a plurality of signal transmission apparatus, the camera control signal with reference to the protocol table stored in said memory unit and transmitting the generated camera control signal;
    when a case of a camera function control unit performs a blocking function to intercept the signal of said wireless terminal, said wireless terminal starts the search to receive signals from the new system;

from the search to receive signals from the new system, setting a wireless channel between said wireless terminal and said signal transmission apparatus and obtaining by said wireless terminal, the camera control signal transmitted from said signal transmission apparatus equipped in said case;

recognizing by said wireless terminal, the parameter information of the obtained camera control signal, and then determining whether the camera control signal is the camera on control signal or the camera off control signal.

* * * * *